Dec. 23, 1969  J. L. LAGASSE ET AL  3,485,432

CUT-OFF AND INSERTING TOOL

Filed Feb. 24, 1967  10 Sheets-Sheet 1

INVENTORS
J. L. LAGASSE
J. PALARDY
J. E. GREENLAY
J. P. GUIMOND
M. TOUSSAINT

BY *Curphey & Erickson*
PATENT AGENTS

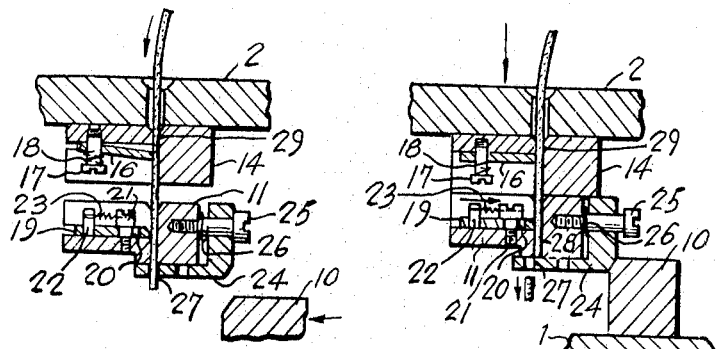
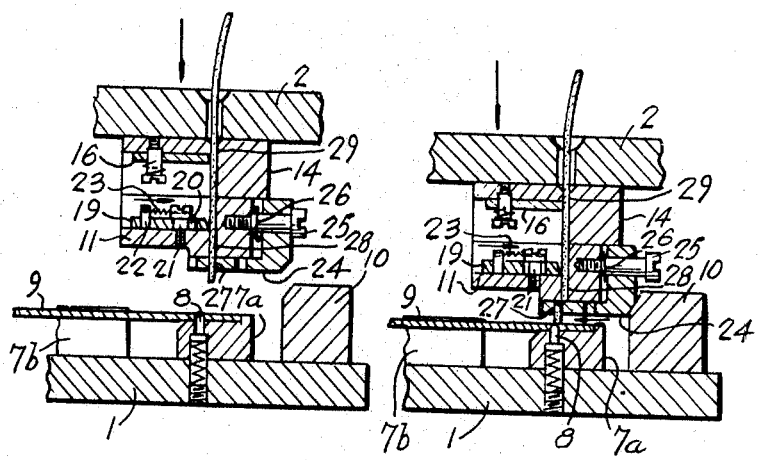

INVENTORS
J. L. LAGASSE
J. PALARDY
J. E. GREENLAY
J. P. GUIMOND
M. TOUSSAINT

BY *Curphey & Erickson*
PATENT AGENTS

INVENTORS
J. L. LAGASSE
J. PALARDY
J. E. GREENLAY
J. P. GUIMOND
M. TOUSSAINT
BY *Murphey & Erickson*
PATENT AGENTS

INVENTORS
J. L. LAGASSE
J. PALARDY
J. E. GREENLAY
J. P. GUIMOND
M. TOUSSAINT

BY Curphey + Erickson
PATENT AGENTS

3,485,432
CUT-OFF AND INSERTING TOOL
Joseph Louis Lagasse and Jacques Palardy, Montreal, Quebec, John E. Greenlay, Rosemount, Quebec, Jean P. Guimond, Croydon, Quebec, and Marcel Toussaint, Chambly County, Quebec, Canada, assignors to Northern Electric Company Limited, Montreal, Quebec, Canada
Filed Feb. 24, 1967, Ser. No. 618,416
Int. Cl. B27f 7/00; A43d 69/12
U.S. Cl. 227—97                 13 Claims

ABSTRACT OF THE DISCLOSURE

This invention relates to a tool which feeds, cuts and inserts pins in holes moulded into a piece part all in one operation. Broadly speaking, the tool comprises a first mechanism for feeding simultaneously predetermined lengths of material from continuous stocks, a second mechanism for cutting pins of equal length from the stocks, and a third mechanism including elements of the second mechanism for inserting the pins into the piece part. All three mechanisms are actuated in one operation of the tool.

---

This invention relates to a tool for inserting pins in holes formed in piece parts of various configurations.

Prior to the development of the design hereinafter described, the pins were cut to length and assembled by hand to the piece parts. This operation was slow and the manufacturing cost was high. The quality of the finished product was also affected because the length of the pins could not be controlled accurately.

The drawbacks of the prior art have been overcome, in accordance with the invention, by providing a tool which feeds, cuts and inserts pins in holes formed in a piece part all in one operation. Broadly speaking the tool comprises a first mechanism for feeding simultaneously predetermined lengths of material from continuous stocks, a second mechanism for cutting pins of equal length from the stocks, and a third mechanism including elements of the second mechanism for inserting the pins into the piece part. All three mechanisms are actuated in one operation of the tool.

The invention will now be described with reference to two embodiments of the invention which are disclosed for illustration purposes only with no intent to limit the scope of the invention. In the drawings:

FIGURE 4 illustrates the loading operation prior to production;

FIGURE 5 illustrates the tool cutting the excess material on loading;

FIGURE 6 illustrates the position of the tool on downstroke after the feed is completed;

FIGURE 7 illustrates the position of a pin at cutting time in relation to the piece part;

Figure 1:
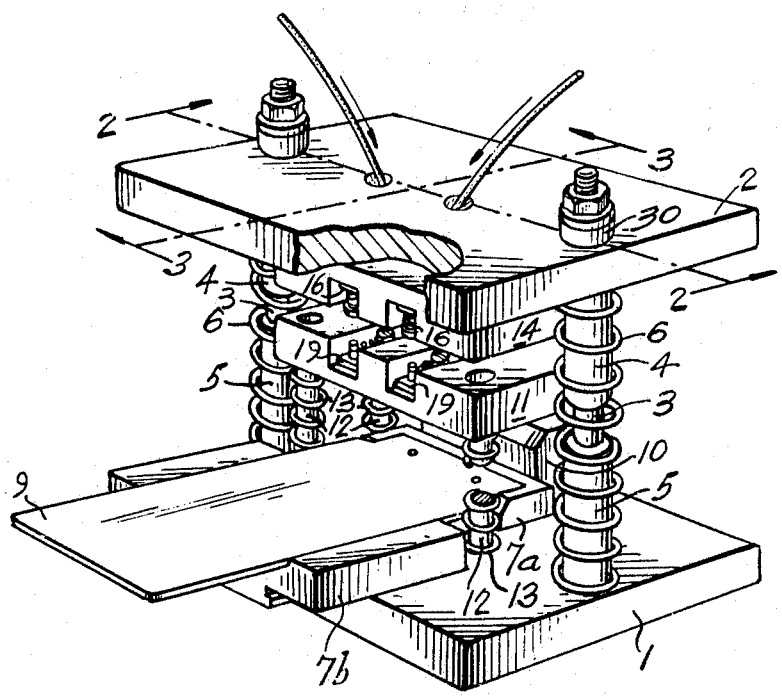
FIGURE 1 illustrates a perspective view of a tool for inserting pins.
Figure 2:
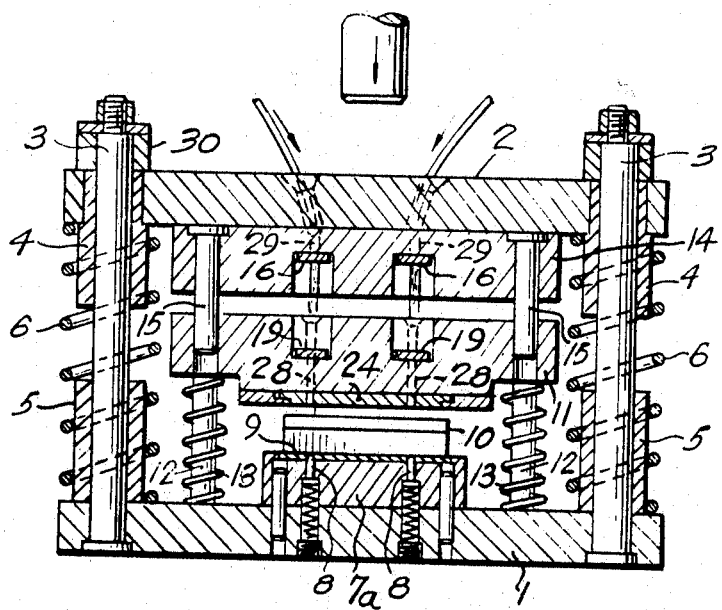
FIGURE 2 illustrates a section view through the tool along line 2—2 of FIGURE 1.
Figure 3:
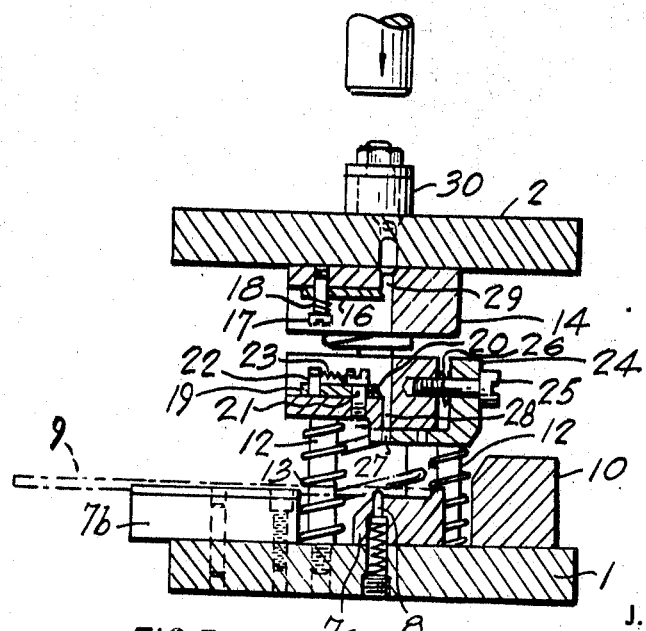
FIGURE 3 illustrates a section view through the tool along line 3—3 of FIGURE 1.

Referring to FIGURES 1, 2 and 3, the tool for inserting pins comprises a base plate 1, and a top plate 2 which is slidably mounted on two liner pins 3 secured to base plate 1. Each liner pin 3 is surrounded by an upper bushing 4 which is secured to the top plate 2 and a lower bushing or bumper 5 which rests on the base plate 1. The upper and lower bushings are surrounded by a spring 6 which maintains the top and base plates a predetermined distance apart.

The base plate 1 holds nesting plates 7a and 7b, and locating pins 8 for accurately positioning a printed wiring board 9 into which, in the present application of the invention, nylon pins are to be inserted. The base plate 1 also nests a bevelled cutting cam 10 which operates the cutting mechanism as it will be described later.

Intermediate the top plate and the base plate is a middle block 11 which acts as a cutting and inserting means for the tool. Middle block 11 is slidably mounted on four legs 12 secured to the base plate, one in each corner of the block. Each leg is surrounded by a spring 13 which maintains the middle block 11 a predetermined distance from the base plate.

To the top plate 2 is fastened the nylon rod feeding block 14 which acts as a feeding means for the tool. The feeding block 14 includes two pins 15 which are located in the same plane as liner pins 3 and protrude through holes in the middle block 11 for lining up the feeding block 14 and the middle block 11.

The feeding block 14 further comprises feeding plates 16 each having a hole therein for receiving a bolt 17 and being biased into position by a spring 18 surrounding bolt 17.

Middle block 11 further comprises gripper plates 19 each having a slot 20 therein for receiving a bolt 21 to hold the plate in position. Each plate has a pin 22 to which is attached one end of a spring 23, the other end of which being secured to bolt 21.

A cutter 24 is secured to the back of middle block 11 by a bolt 25 and is biased in a rearward position by spring 26. Cutter 24 has a hole 27 which is adapted to be in alignment with corresponding holes 28 and 29 in blocks 11 and 14 respectively. The cutter is also bevelled for engagement with the bevelled portion of cutting cam 10 as will be described hereinafter.

A spacer 30 is located around the upper portion of each liner pin 3 to control the length of feed and the stroke of the inserting tool.

A pneumatic, mechanical or manual press provides the downstroke movement for feeding, cutting and inserting the nylon pins. The springs 6 around the liner pins 3 are compressed between the top and base plates on the downward motion of the tool and return it back to its starting position when the operation is completed.

The operation of the tool will now be described with reference to FIGURES 4–8 which illustrate the various stages of the operation of the tool. As a preliminary step, the nylon rods which are usually wound on two spools (not shown) one on each side of the tool are threaded through holes in the top plate 2 and pushed down by hand through aligning holes in feeding block 14 and middle block 11 past feeding plate 16 and gripper plate 19. The feeding plate 16 pivots downwardly against the biasing action of spring 18 and the gripper plate 19 slides horizontally in slot 20 against the action of spring 23 as illustrated in FIGURE 4. The rods are pushed down until they protrude slightly from holes 27 in cutter 24.

Then without a board in the nesting plate, as illustrated in FIGURE 5, the operator actuates one stroke of the tool to cut the excess rod. As the feeding block 14 moves down, the feeding plates 16 grab the rods and push them through the gripper plates 19. When the feeding plate 14 contacts the middle block 11, the latter is moved down with the feeding plate 14 until the bevelled portion of cutter 24 attached to middle block 11 contacts the bevelled portion of cam 10 secured to the base plate 1. Engagement of the bevelled portions of cutter 24 and cam 10 during continued downward movement of middle block 11 causes cutter 24 to move forwardly and cut off the portions of the nylon rods protruding beyond the lower surface of middle block 11.

The tool is now ready to operate and a printed wiring board 9 may be deposited on the nesting plates 7a and 7b locating it with the nesting pins 8 entering corresponding holes in the board, as illustrated in FIGURE 6. On the downward motion, feeding block 14 will thrust the two rods of nylon material downward until block 14 touches middle block 11. At that moment, the required length of each nylon rod protrudes from the lowest surface of middle block 11. The gripper plate 19 operated by spring 23 is pushed into the rod preventing it from coming back by its locking action. The whole top assembly comprising feeding block 14 and middle block 11 will continue its descent until cutter 24 contacts cam 10 which in turn will move cuttter 24 forward in a horizontal direction cutting the pins at the required length. The cutter and cam are dimensioned so that the nylon pins are severed from the rods when the lower ends of the pins are a very short distance above board 9 so that the pins will drop on the board without leaving the hole 27 in cutter 24 as illustrated in FIGURE 7.

Figure 8:
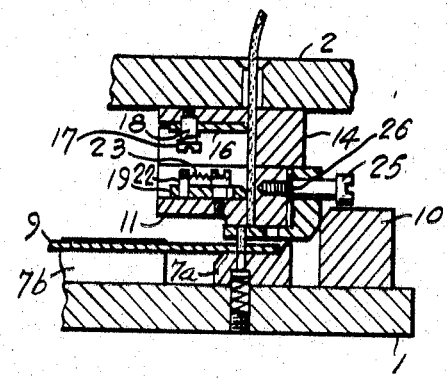
FIGURE 8 illustrates the position of a pin pressed into a piece part at completion of a stroke.

The cutter continuing its forward motion originating from the cam 10 will move the pins over the holes in the board where they will be pressed in by middle block 11 as the downstroke is completed as illustrated in FIGURE 8. The end of the stroke is controlled by the liner bushings 4 hitting the bumpers 5.

The propulsion for the upward motion is supplied by the springs 6. During the upward movement, the nylon rods are locked in position by the gripper plates 19 to prevent movement of the rods relative to middle block 11 while the feeding plates 16 slide on the rods.

Figure 9:
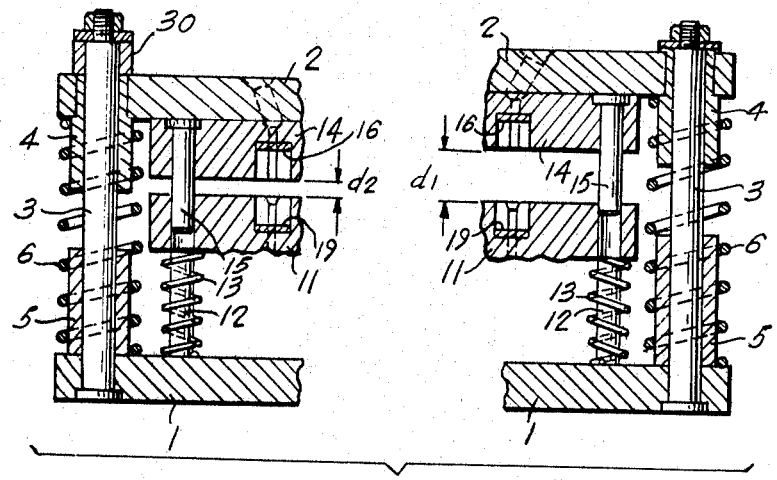
FIGURE 9 illustrates how the top spacer regulates the feed or gap between the feeding block and the middle block assembly.

The spacers 30 at the tip of the liner pins 3 determine the length of feed by regulating the gap between the feeding block 14 and the middle block 11 as illustrated in FIGURE 9. The use of a thin spacer will result in a longer feed $d_1$ and a thick one a shorter feed $d_2$.

Figure 10:
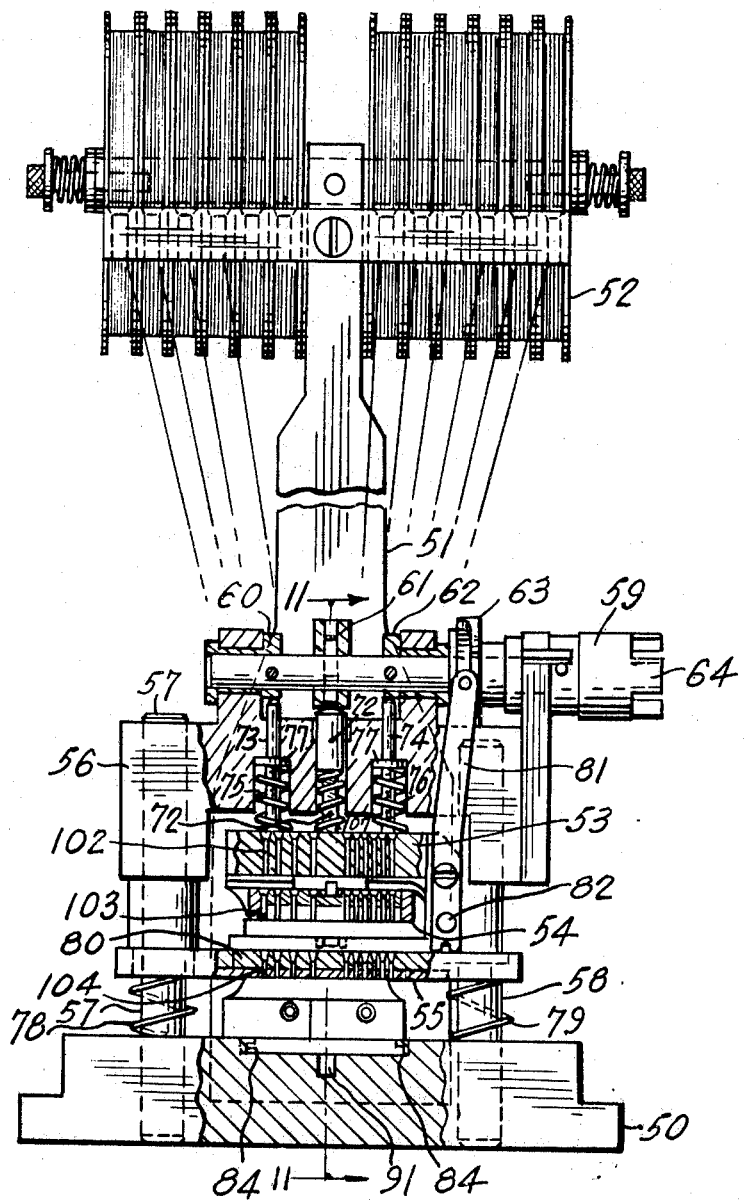
FIGURE 10 illustrates a front view of a tool in accordance with a second embodiment of the invention showing a typical section through the tool.
Figure 11:
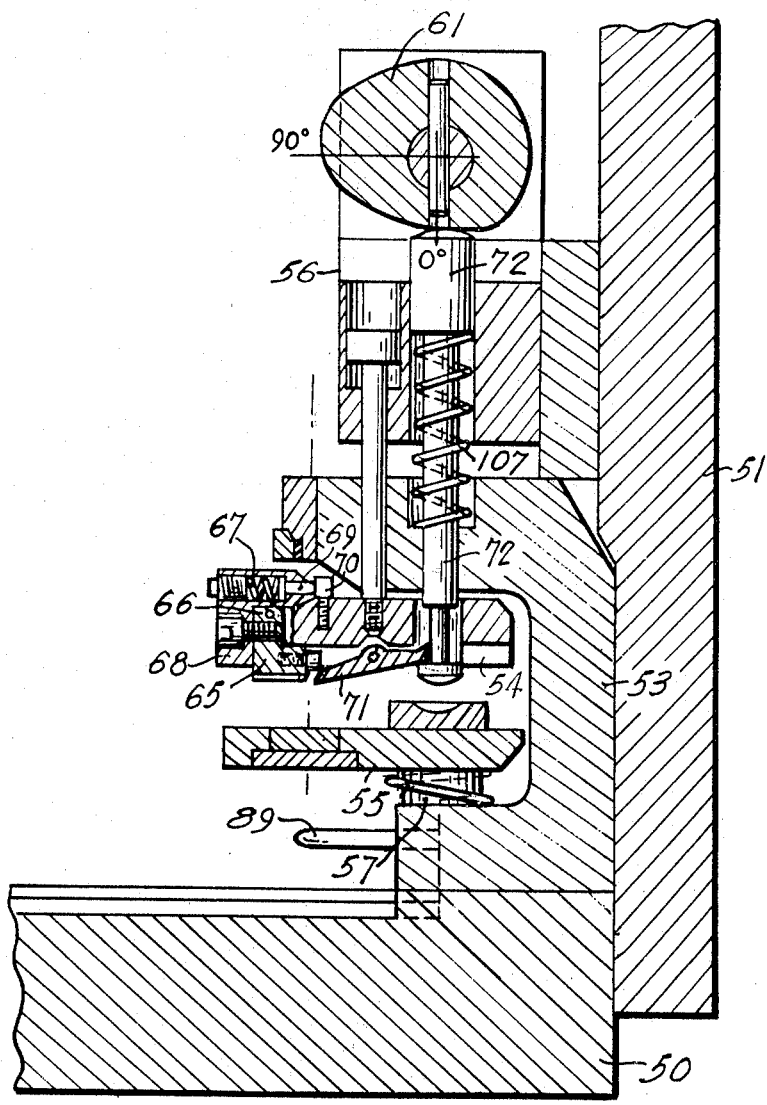
FIGURE 11 is a section through line 11—11 of FIGURE 10 but also showing the feeding mechanism of the tool which does not appear in FIGURE 10.

In FIGURES 10 and 11 there is shown a second embodiment of the invention which is adapted for inserting metal pins into a piece part having moulded holes in it. The tool comprises a base plate 50 to which is secured a stand 51 for mounting spools 52 holding the wire used in making the pins. Also attached to the base plate 50 is a support bracket 53 holding the feeding and cutting means or mechanisms 54 and 55 respectively. A shaft assembly support 56 is mounted on two liner pins 57 and 58 which are secured to base plate 50.

Figure 14:
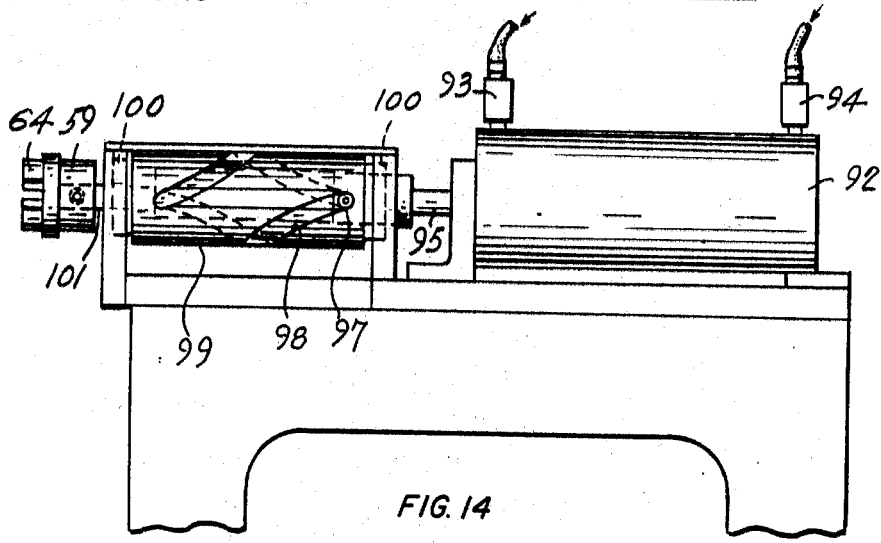
FIGURE 14 illustrates an air driving mechanism which may be used for driving the tool.

A shaft assembly 59 is rotatably mounted in the upper portion of the shaft assembly support 56. The shaft assembly 59 includes three vertical motion cams 60, 61 and 62 and a cutting cam 63, and may be operated manually or by means of a power driving mechanism as illustrated in FIGURE 14 through a clutch 64.

The feeding mechanism 54, as illustrated in FIGURE 11 comprises a wire clamping jaw 65 which is rotatably mounted on a pin 66 secured to the feeding mechanism. The clamping jaw 65 is biased counterclockwise against the front surface of the feeding mechanism by means of a spring 67 located in the upper leg of an L-shaped bracket 68 secured to clamping jaw 65. Spring 67 contacts a pin 69 bearing on an abutment 70 located on the feeding mechanism 54. The feeding mechanism is released by a pawl 71 which is operated by a piston 72. The feeding mechanism is held by two pistons 73 and 74 (see FIGS. 10 and 15) and two springs 75 and 76 surrounding pistons 73 and 74. As shown in FIGURE 10 springs 75 and 76 are compressed between the support bracket 53 and a washer 77 secured to pistons 73 and 74, thus biasing the feeding mechanism to the upper position. The feeding mechanism is operated through pistons 73 and 74 by cams 60 and 62, respectively, secured to shaft assembly 59.

The cutting mechanism 55 is slidably mounted on linear pins 57 and 58 and biased in the upper position by means of springs 78 and 79 which are compressed between the base of the tool and the cutting mechanism 55. The cutting mechanism comprises a cutter 80 which is positioned in a channel in the upper surface of the cutting mechanism for lateral sliding movement when operated by a lever 81 which is pivoted by cam 63 around a pivot point 82.

Figure 12:
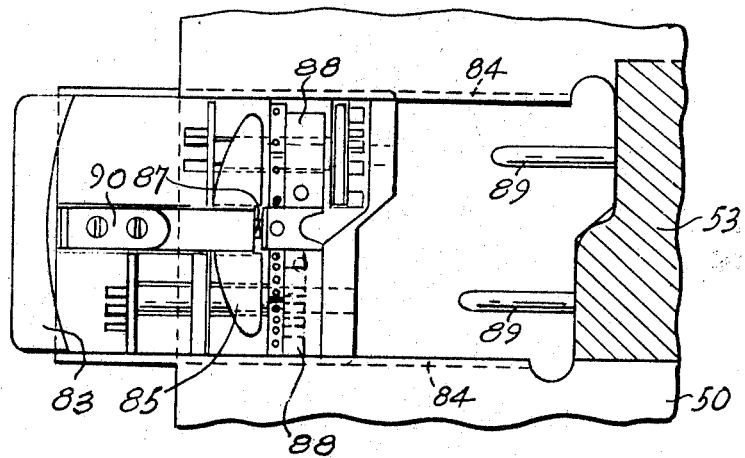
FIGURES 12 and 13 illustrate the loading tray for loading the piece parts.
Figure 13:
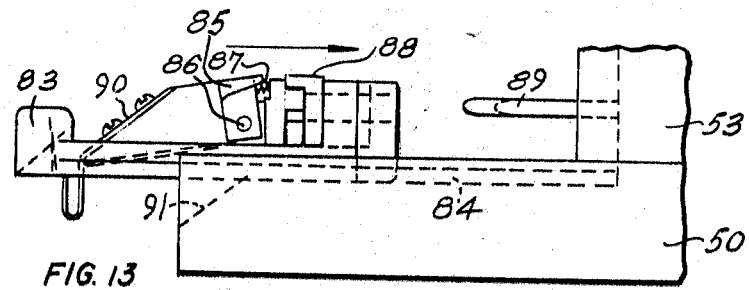
Figure 16:
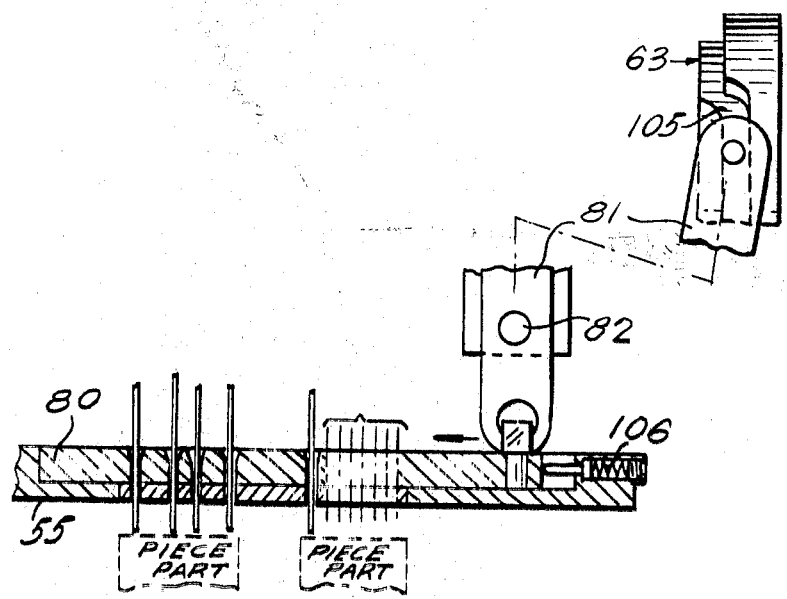
Figure 17:
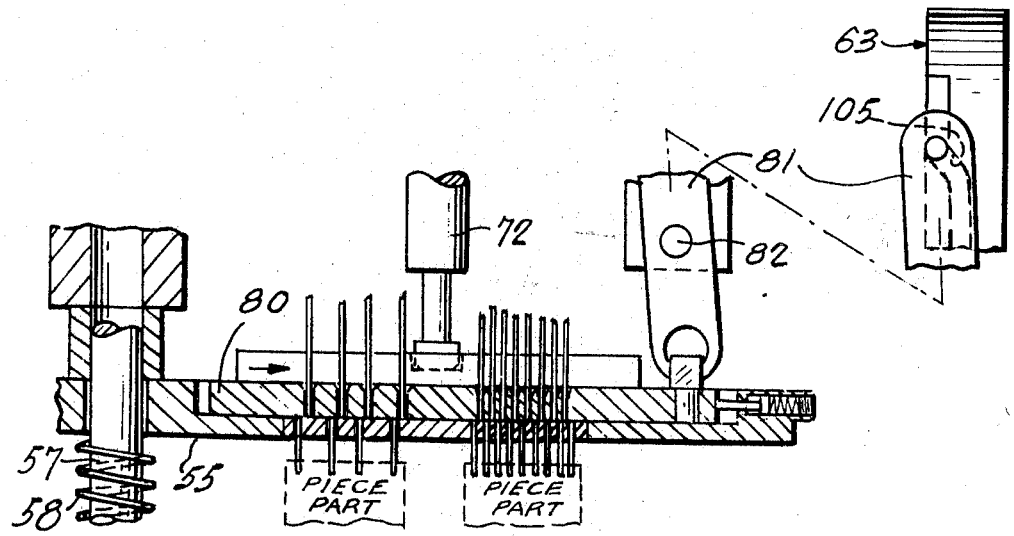

FIGURES 12 and 13 illustrate a loading tray 83 for loading two piece parts which are to be fed into the tool side-by-side (see FIGS. 16 and 17). The tray is adapted to slide into slots 84 located in base plate 50 of the tool. Tray 83 comprises a clamping jaw 85 which is pivoted counterclockwise around a pivot 86 by means of a spring 87. The piece parts are positioned in the tray from opposite sides thereof in such a way that the portions of the piece parts having moulded holes contact abutments 88 of the tray. When the tray is pushed in, the piece parts are centralized by pins 89 which protrude through holes in the piece parts and are clamped by the clamping jaw 85 under the action of a spring 90 secured to the jaw, which spring is tripped by angle slot 91 (also shown in FIGURE 10) on base plate 50 of the tool.

FIGURE 14 illustrates an air driving mechanism which may be used for driving the tool. The driving mechanism comprises an air cylinder 92 having front and rear air inlets 93 and 94 for moving a piston 95 back and forth in a known manner. Secured to piston 95 is a trunnion 97 which is arranged to slide in the helical groove 98 of a hollow cylinder 99 which is adapted to receive trunnion 97. Cylinder 99 is prevented from moving longitudinally by thrust bearings 100 secured to the base of the driving mechanism.

The forward movement of piston 95 is translated into a rotational movement by means of grooves 98 in cylinder 99. The pitch of the grooves 98 and the stroke of piston 95 determine the angle of rotation. The rotational movement of cylinder 99 is transmitted to clutch 64 in FIGURE 10 by means of a shaft 101 interconnecting the cylinder and the clutch.

The operation of the tool will now be described with reference to FIGURES 15–18 which illustrate the various stages of the operation of the tool. As a preliminary step, the wires from spools 52 in FIGURE 10 are threaded through holes 102 in the upper portion of support bracket 53 and pushed down through holes 103 and 104 in feeding mechanism 54 and cutting mechanism 55 respectively. Then without a piece part in the loading tray, the shaft assembly is rotated to cut the excess wire. Rotation of the shaft assembly causes the cutting lever 81 to pivot around point 82 under the action of cam 63. The movement of cutting lever 81 forces the cutter 80 to slide to the right and shear the wires. The tool is now ready for operation and a piece part may be deposited in the loading tray and pushed in position for receiving the pins.

Figure 15:
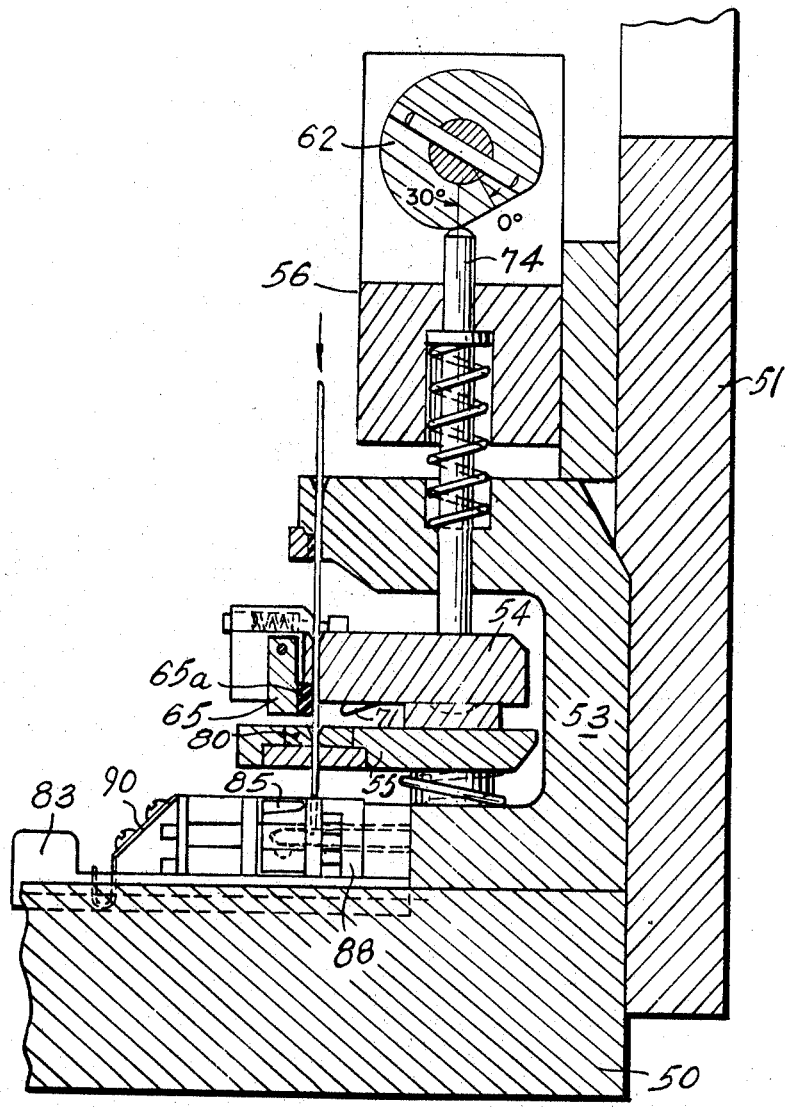
FIGURES 15–18 illustrate schematically the various stages of operation of the tool.

Upon rotation of shaft assembly 59, pistons 73 and 74 are moved down by cams 60 and 62 as illustrated schematically in FIGURE 15 (only one piston and one cam are shown). On the downward motion of the feeding mechanism the wires are grabbed by a hard rubber clamping pad 65a secured to jaw 65 and pushed down until they touch the piece part. The feeding operation is completed after approximately 30° of rotation of cams 60 and 62.

The cutting operation starts immediately after the feeding operation is completed. FIGURES 16 and 17 illustrate schematically the cutting mechanism before and after the cutting operation. Cam 63 has a slot 105 having a slanted portion which causes the cutting lever 81 to pivot about pin 82 as mentioned previously. Such action causes the cutter to move against the action of spring 106 to shear the wires. The cutting operation is completed after approximately 60° of rotation of shaft assembly 59. At that stage piston 72 is in contact with cutting mechanism 55 under the action of cam 61.

Figure 18:
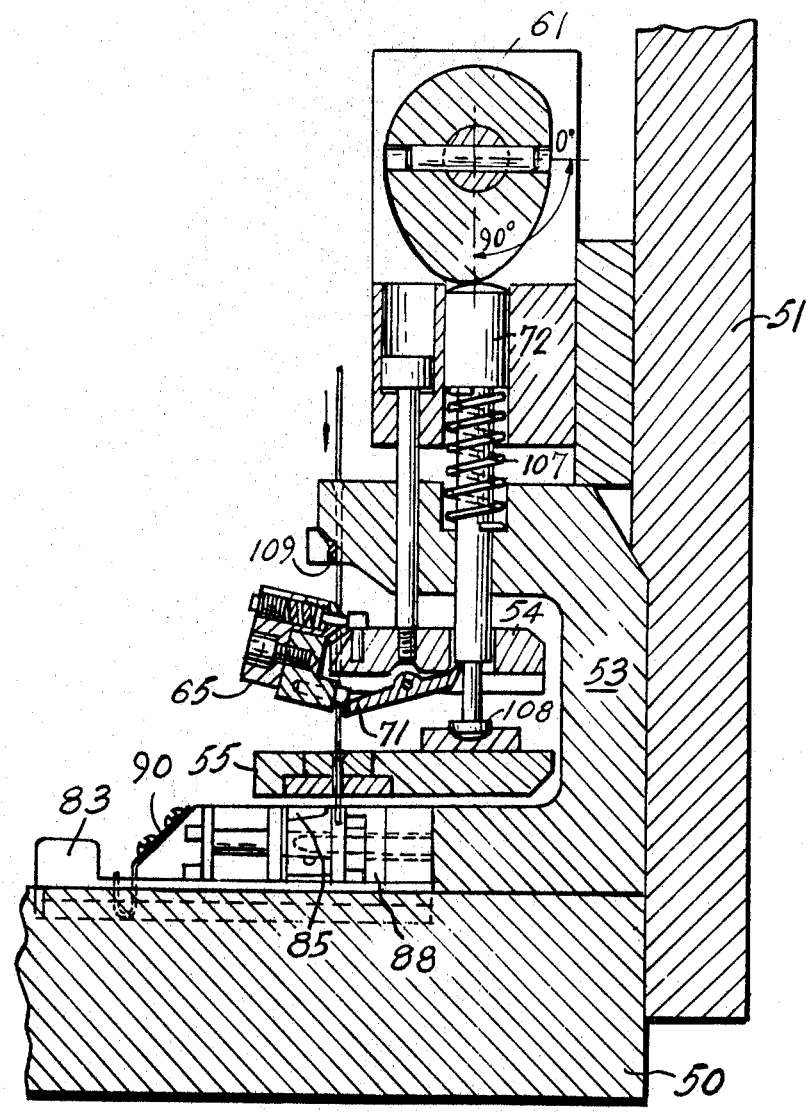

When the cutting operation is completed, the cutting lever 81 holds cutter 80 in the fully operated position under the action of cam 63. Simultaneously cam 61, upon the continued rotation of shaft assembly 59, operates piston 72 and moves the cutting mechanism down as illustrated in FIGURE 18. Cutter 80, as illustrated in FIGURE 17, acts as a presser to insert the cut wires or pins into the moulded holes in the piece parts. Towards the end of the inserting operation piston 72 operates pawl 71 to pivot clamping jaw 65 to release the wires and permit the feeding mechanism to return to its original position. When piston 72 is returned to its original position under the action of a spring 107, portion 108 of piston 72 returns pawl 71 to its normal position thus permitting the clamping jaw 65 to grab the wires for the next feeding operation.

To maintain proper tension on the wires, a rubber pad 109 is provided on the support bracket 53 for contacting the wires during the complete operation of the machine.

While the invention has been described with reference to two specific embodiments, it is to be understood that other equivalent types of feeding, cutting and inserting mechanism may be used. Consequently, the invention is not to be limited by the embodiments disclosed but by the following claims which define the real scope of the invention.

What is claimed is:
1. A tool for inserting pins in holes in a piece part comprising:
   (a) means for feeding predetermined lengths of elongated material from continuous stocks into the tool and for advancing said material longitudinally toward the piece part in alignment with the holes therein;
   (b) means for cutting pins of said predetermined lengths from said continuous stocks, said cutting means comprising a first cutting element movable with respect to a second cutting element transversely of said stocks;
   (c) means for actuating said cutting means to move said first cutting element relative to said second cutting element to cut the pins from the stocks and to position a surface of one of said cutting elements behind the cut ends of the pins; and
   (d) means for moving the cutting means toward the piece part while the first cutting element is actuated whereby said one of said cutting elements bears on the cut ends of the pins to advance them into the holes in the piece part.

2. A tool as defined in claim 1 wherein said one of said cutting elements is the first cutting element.

3. A tool as defined in claim 2 wherein each of the cutting elements is provided with separate apertures for said stocks, corresponding apertures in said cutting element being in alignment prior to actuation of the first cutting element.

4. A tool as defined in claim 2 wherein said actuating means comprises cam means.

5. A tool as defined in claim 2 wherein said actuating means comprises a rotary cam and means interconnecting said cam and the first cutting element to actuate the latter in response to rotation of said cam.

6. A tool as defined in claim 5 wherein the first cutting element is actuated by said actuating means before the cutting means is moved toward the piece part by said moving means to insert the pins in the piece part.

7. A tool as defined in claim 5 wherein said interconnecting means comprises a lever pivotally supported intermediate the ends thereof and having said ends in operative engagement respectively with the cam and the first cutting element.

8. A tool as defined in claim 7 wherein the first cutting element is actuated by said actuating means before the cutting means is moved toward the piece part by said moving means to insert the pins in the piece part.

9. A tool as defined in claim 1 wherein said one of said cutting elements is the second cutting element.

10. A tool as defined in claim 9 wherein each of the cutting elements is provided with separate apertures for said stocks, corresponding apertures in said cutting element being in alignment prior to actuation of the first cutting element.

11. A tool as defined in claim 9 wherein said actuating means comprises cam means.

12. A tool as defined in claim 9 wherein said actuating means comprises a stationary cam positioned in the path of the cutting means toward the piece part for engagement with the first cutting element, said moving means being adapted to move the cutting means past said stationary cam for actuation of the first cutting element to cut pins from the stocks before said pins are inserted in the piece part.

13. A tool as defined in claim 12 wherein said moving means comprises said feeding means.

References Cited

UNITED STATES PATENTS

| | | | |
|---|---|---|---|
| 2,979,721 | 4/1961 | Helda | 227—97 |
| 3,134,982 | 6/1964 | Gagnon et al. | 227—93 X |

TRAVIS S. McGEHEE, Primary Examiner

E. F. DESMOND, Assistant Examiner